(12) United States Patent
Kolos et al.

(10) Patent No.: US 6,233,137 B1
(45) Date of Patent: May 15, 2001

(54) COMPACT POWER DISTRIBUTION SUBSTATION

(76) Inventors: Mathias Kolos, 132 rue Angell, Beaconsfield (CA), H9W 4V7; Jacques LeFrancois, 2000 rue de Flandre, St. Hyacinthe (CA), J2T 4N5

(*) Notice: Subject to any disclaimer, the term of this patent is extended or adjusted under 35 U.S.C. 154(b) by 0 days.

(21) Appl. No.: 09/578,185

(22) Filed: May 25, 2000

(51) Int. Cl.[7] .................................................. H02B 1/04
(52) U.S. Cl. ........................................ 361/603; 200/48 R
(58) Field of Search .................................. 307/112, 113, 307/142, 148; 218/75, 143; 200/48 R, 48 A; 361/601–603, 605, 606, 611, 620, 622, 623, 641

(56) References Cited

U.S. PATENT DOCUMENTS

| | | | |
|---|---|---|---|
| 3,697,819 | * | 10/1972 | Eichelberger . |
| 4,428,027 | * | 1/1984 | Ohyama . |
| 4,500,935 | * | 2/1985 | Tsuruta . |
| 4,816,983 | * | 3/1989 | Yoshizumi . |
| 5,648,888 | * | 7/1997 | Le Francois . |
| 5,715,134 | * | 2/1998 | Maineult . |
| 5,777,842 | * | 7/1998 | Tsukushi . |

* cited by examiner

*Primary Examiner*—Gerald Tolin
(74) *Attorney, Agent, or Firm*—Philip Koenig; Pittas/Koenig

(57) ABSTRACT

A compact indoor power distribution substation employs ambient-air-insulated high-voltage components, in lieu of gas-insulated components, for the distribution at 36 kV or less of electrical power from 60 kV to 245 kV high-voltage incoming lines. The substation is contained in a rectangular building having a ground floor and a cross-shaped upper floor. A corridor of sufficient size to accommodate a maintenance truck extends from a gate at the front to the back of the substation building, and this corridor divides the ground floor into two sides: each comprises in order, from front to back, a walled transformer room enclosing one or two primary transformers, a walled mid-voltage switch-gear room electrically connected to the mid-voltage side of the primary transformers and also to outgoing distribution lines, and a room, at the rear of the building, that receives an incoming high voltage line and that contains ambient-air-insulated breakers, bus banks and connect/disconnect switches that effect the electrical communication of the incoming lines to the primary transformer, via overhead bus bars that span a portion of the upper floor above the switch-gear rooms. A control room is located above the ground floor corridor at the rear end of the upper floor, and has no active electrical equipment beneath it.

10 Claims, 5 Drawing Sheets

COMPACT POWER DISTRIBUTION SUBSTATION

FIELD OF THE INVENTION

The present invention relates to the field of power distribution substations, and more specifically to the "indoor" type of substation that employs principally ambient-air-insulated electrical components to distribute, to a retail consumption pool and at a reduced voltage, "high-voltage" electrical power received at the substation at a voltage in a range between 60 kilovolts and 245 kilovolts.

BACKGROUND OF THE INVENTION

The term "power distribution substation" is used herein to refer to an electrical substation where incoming high-voltage electrical power, ranging from 60 kV to 245 kV, is converted and distributed to a consumption pool at a voltage equal to or lower than 36 kV. So-called "primary" electrical equipment, including power transformers (both high voltage and mid-voltage), circuit breakers, switches, bus-banks and bus-bars, are employed to effect and condition the voltage reduction that is the primary function of the power substation, and to distribute the reduced-voltage power to a plurality of outgoing lines.

There are several well-known types of power distribution substations. The most common is the "exterior" or "outdoor" substation, in which the primary electrical equipment, including transformers, circuit breakers and associated equipment, is installed in the open air on an outdoor site. Outdoor substations typically employ conventional ambient-air-insulated equipment, including high-voltage circuit breakers and transformers, that is "tried and true" and comparatively inexpensive, and the electrical equipment is usually readily accessible for purposes of maintenance, repair and replacement. However this type of substation has the disadvantages that it generally requires a large surface area, and that it is esthetically unattractive. Another disadvantage of the outdoor substation type is that the electrical equipment is subject to climatic and weather conditions, which may be harsh and include wide temperature ranges, rain, lighting, and possibly icing conditions, which may occasion a great deal of maintenance.

The space requirements of outdoor substations, and their unesthetic appearance, disqualify this type of substations for many urban applications, at a time when urban populations, and their needs for electrical power, have grown rapidly and often require high-voltage feeds, up to 245 kV, into the heart of many cities, for distribution therein at reduced voltages of 36 kV or less.

For urban applications where the space and other conditions required by conventional outdoor substations are not available, a second type of substation, termed "gas-insulated", has been developed and is now widely used. As exemplified by the substations disclosed in U.S. Pat. No. 5,777,842 issued to Tsukushi et al., and in U.S. Pat. No. 4,500,935 issued to Tsuruta et al., gas-insulated substations make use of electrical components, including transformers, circuit breakers, bus-banks and switches, which are individually contained in sealed enclosures, and that are insulated within said enclosures by a pressurized dielectric fluid, principally including sulfur hexafluoride ($SF_6$) gas. Such "gas-insulated" substations are generally much smaller than substations of the "outdoor" type, and their primary electrical equipment is protected from the weather, but this type of substation also has a number of serious disadvantages, which render "gas-insulated" substations unsuitable for many applications, including many "small lot" applications for which outdoor substations are also not feasible.

A first and important disadvantage of "gas-insulated" substations is that the acquisition cost of compact "gas-insulated" electrical components is three to four times the cost of electrically comparable ambient-air-insulated electrical equipment. Thus the acquisition cost of a high-ampere gas-insulated circuit breaker, suitable for handling 145 kV electrical power, is several times the cost of an ambient-air-insulated circuit breaker having comparable performance specifications, and similar cost differences, between ambient-air and gas-insulated versions, apply to other primary electrical components. As a result the total cost of a gas-insulated substation is typically several times the construction cost of a substation that employs ambient-air components to achieve comparable functional performance.

Maintenance and repair costs are also much higher for gas-insulated equipment than for ambient-air insulated equipment. This is in large part because the most widely used insulating fluid, compressed sulfur hexafluoride gas, is a dangerous product with toxic and highly corrosive decomposition products, and it must be handled only by specially qualified personnel, using specialized equipment and acting with great precaution. Furthermore the use of electrical components insulated with sulfur hexafluoride gas is increasingly discouraged, and may in the foreseeable future be banned, because this gas is environmentally very deleterious. As reported in a paper submitted to the 1998 Circuit Breaker Test and Maintenance Conference, held Oct. 6–9, 1998 in Pittsburgh, Pa., the chemical characteristics of sulfur hexafluoride gas, notably its great capacity for absorbing infrared radiation, have "resulted in an extremely high Global Warming Potential rating", equal to 25,000 times the GWP rating of carbon dioxide (the most common greenhouse gas) and qualifying $SF_6$ as "the most powerful greenhouse gas known." The use and disposal of gas-insulated electrical equipment therefore poses serious environmental hasards, which further disfavors the use of this equipment.

In view of the respective shortcomings of outdoor substations and of gas-insulated substations, described above, there exists a great need for a low-cost and easily serviced indoor substation, that can be located on a small urban lot and that avoids the disadvantages of said prior art substations. Prior art efforts to meet this need, by providing an indoor substation that uses principally ambient-air-insulated electrical equipment, include notably the substation shown in our earlier issued U.S. Pat. No. 5,648,888 to Le Francois et al., issued on Jul. 15, 1997. That substation has the important disadvantage, however, that the high-voltage equipment is arranged on two or more levels of the building, and generally in a manner that makes accessibility to the primary electrical equipment difficult, whether for installation, servicing or removal, resulting in increased operating costs. Also the electrical equipment used in said substation is ill-suited to handle incoming voltages higher than 145 kV, and the dimensions of the substation (about 150 feet square for a single transformer station) are comparatively large, making this substation unsuitable for many urban sites. For these reasons, no presently known substation design provides a fully enclosed, compact power distribution substation, in circumstances where the incoming voltgage is higher than 100 kV. Gas-insulated substations, with all of their disadvantages, as presently the only feasible design solution for such applications.

OBJECTIVES OF THE INVENTION

It is therefore a principal object of the present invention to provide an indoor power substation, comprising principally ambient-air-insulated components, that overcomes the disadvantages of the prior art described above, and specifically the disadvantages of the substation of U.S. Pat. No. 5,648,888. It is a related objective to provide an arrangement of ambient-air-insulated high-voltage electrical components that results in a substation that is capable of handling incoming voltages to a maximum of 245 kV, that has dimensions substantially smaller than those of any presently known indoor substation that employs ambient-air-insulated high-voltage components, and yet that enables ready and safe access by substation personnel to all active electrical components for purposes of maintenance or replacement.

It is another important objective of the invention to provide such an indoor power substation that employs principally low cost and safe ambient-air-insulated primary electrical components in a fully enclosed building having reduced dimensions, in the order of 100 feet square, heretofore believed to require the substantially exclusive use of expensive and environmentally deleterious "gas-insulated" electrical components.

It is yet another object of the invention to provide an indoor power substation, for the distribution of high-voltage (up to 245 kV) incoming electrical power at a mid voltage (in the range of 36 kV and less) appropriate for distribution to a retail user pool, that employs principally low cost and safe ambient-air-insulated primary electrical components, and yet that has reduced dimensions that permit locating the substation in dense urban locations unsuitable for the placement of a conventional exterior power substation.

It is another object of the present invention to provide an indoor substation comprising two sets of incoming high-voltage lines and two sets of primary transformers and associated electrical equipment, thereby enabling two independent circuits to be established for the distribution of electrical power to a distribution pool at a reduced voltage, and further enabling the permutation of the electrical equipment in said two circuits so as to permit the shut-down, repair and replacement of any piece of primary electrical equipment without requiring any interruption in the provision of electrical power to the distribution pool.

It is yet another object of the present invention to provide a compact and enclosed power substation comprising a multiplicity of transformers (two, three or four in number), wherein access to each of said transformers is provided, for purposes of maintenance, repair and replacement, both from an internal corridor accessible to a maintenance truck and from the exterior of the substation building.

SUMMARY OF THE INVENTION

The above objectives are met by the present invention of a compact and fully enclosed power substation, capable of converting high-voltage incoming power (to a maximum of 245 kV) to a medium-voltage suitable for a distribution pool, wherein all high-voltage components (including voltage and current transformers, circuit breakers, bus banks and switches) on the high-voltage side of the primary transformers are comprised of ambient-air-insulated electrical components.

The power substation of the present invention comprises an enclosed structure having a ground floor and an upper floor. Within the substation all of the primary electrical equipment is located on a single level, the street-level ground floor, and all of said primary electrical equipment is readily accessible to service personnel, and even to a maintenance vehicle, from a central corridor that extends from an entry door at the mid-point of the front (street-facing) wall of the substation to the mid-point of the rear wall of the substation.

Notwithstanding the provision of an interior corridor adapted to accommodate a maintenance vehicle, the arrangement of the electrical and other equipment within the substation of the invention permits the overall structure of the substation to be remarkably small. In particular the footprint of the substation of the invention is believed to be less than half that of any presently known substation which is adapted for 60 kV to 245 kV high-voltage capability, and that employs ambient-air-insulated high-voltage components. For a 145 kV substation according to the invention, comprising two primary transformers, the four exterior walls of the substation may each be only about 100 feet in length; where it is desired to provide an additional one or two primary transformers, for a total of three or four primary transformers, a 50 to 100 foot extension of the length of the parallel front and rear walls will suffice to accommodate the additional primary transformer or transformers. These small dimensions allow a substation according to the invention to be placed on small urban lots, and also serve to minimize the cost of its construction.

In the substation of the present invention, all of the primary electrical equipment is placed on the ground floor, and secondary equipment, including capacitor banks, HVAC mechanical equipment, and a control room, are placed on an upper floor. This arrangement places on the ground floor, where it may be readily and fully serviced, all of the facilities and active electrical equipment that requires periodic repair and upkeep service.

The ground floor of the substation of the invention is generally rectangular. It comprises a central access corridor, extending to the rear wall of the substation from an entrance gate in the front wall of the substation. Said gate opens to the street or a yard adjoining the substation, and the gate and the corridor are sized to accommodate a maintenance truck.

The rear portion of the building comprises entry channels for two independent incoming high-voltage incoming lines (each intended to have the capability of supporting the total power requirements of the substation), and it also comprises, on the ground floor on opposing sides of the central corridor, two bus banks that each receives one of said high voltage incoming lines. Said bus banks each serves to connect an incoming high-voltage line to a group of ambient-air-insulated "high-voltage components", including voltage and current transformers, switches, and breakers, that, like said bus banks, are disposed in two complementary sets on opposing sides of the central access corridor at the rear portion of the substation building.

Said "high-voltage components" at the rear end of the substation building are in electrical communication, via overhead bus bars, with two or more (up to four) primary transformers, of the ambient-air-insulated type, that are contained in soundproof and fireproof transformer rooms arranged on opposing sides of the central corridor at the first, front end of the substation building.

In a preferred dual primary transformer embodiment of the present invention, a soundproof, fully enclosed and fireproof transformer room is located on the ground floor at each of the two corners of the front portion of the building, on opposing sides of the central corridor. As stated above, the primary transformers in said rooms in the front part of the ground floor are in electrical connection via bus bars (and ambient-air-insulated rotating switches installed on each end of the bus bars) with breakers and other "high-voltage equipment" at the rear part of the substation building. With this arrangement two high-voltage circuits are formed, one on each side of the central corridor, and each comprising a set of incoming high-voltage line equipment connected to a primary transformer. The bus bars of said two high-voltage circuits are in turn interconnected by connect/disconnect switches, thereby permitting the permutation of the two incoming lines without substation shutdown. This permutation capability enables substation personnel to perform maintenance and repair activities, including the replacement of any electrical component in the substation, without any interruption in station operations.

Lastly, the primary transformers are also in electrical connection to mid-voltage equipment, located in rooms disposed in the mid-portion of the between the high-voltage equipment and the transformer rooms. This mid-voltage equipment serves to condition electrical power, tapped from the mid-voltage side of the primary transformers, to the precise voltage and current levels required by the retail distribution pool or grid, and also to direct the resulting electrical power to a plurality of outgoing distribution lines. A pair of walled rooms on either side of the central corridor, about midway between the front and rear parts of the first floor, thus each encloses a set of conventional substation mid-voltage components, including metal-clad switch gears, potential transformers and ground switches. Outgoing power lines issuing from those metal-clad switch gears exit the substation, preferably through underfloor conduits beneath the mid-voltage equipment compartments, and distribute the electrical power to the distribution pool network.

The central corridor on the ground floor of the substation is provided, at the front of the station, with a principal entrance gate opening onto the street or yard and sized to accommodate a maintenance truck, in order to service the primary electrical equipment, all of which is located on the ground floor of the substation. Preferably the exterior front wall of the substation also comprises, on each side of the principal entrance gate, a removable wall adapted to provide direct access from the street or yard to the adjoining transformer room, thereby enabling replacement of the primary transformers directly from the street or yard. The present arrangement of electrical components and ground floor corridor contrasts sharply with the arrangement set forth in U.S. Pat. No. 5,648,888 (wherein "the high voltage unit, the transformers yard and the mid-voltage unit are adjacent to each other in that respective order"), and it results in dramatically improved access to the primary transformers, for purposes of maintenance, repair or replacement. Also the arrangement of the present invention permits the transformer rooms to be fully enclosed, whereby in the event of a transformer fire the risk of smoke damage to other electrical components and station equipment is avoided.

The substation of the present invention comprises an upper floor that is preferably cross-shaped, comprising an upper corridor preferably floored above the length of the ground floor central corridor and also lateral wings floored above the mid-voltage equipment rooms that are disposed in the middle part of the ground floor, on either side of the central corridor. Said upper floor is reached through stairs at one or (preferably) both ends of the ground floor central corridor. A substation control room is located on the upper floor at the rear of the substation, in a walled enclosure located above the rear part of the ground floor central corridor; said control room therefore has no active electrical equipment beneath it on the ground flloor. The lateral wings of the upper floor preferably extend only above the mid-voltage equipment rooms, and permit station personnel to service the overhead bus bars and associated switches that, traversing over the mid-voltage equipment rooms, serve to connect the high voltage equipment at the rear of the substation to the primary transformers located at the front of the substation. Preferably, capacitor banks are also located on the second floor, at the front end of the substation, and function conventionally in electrical connection to the mid-voltage equipment to maintain the stability of the output voltage.

The enclosure arrangement for the power distribution substation of the present invention may be used in any location, and it is particularly advantageous in areas of high population density, and any other areas where economic, topographical, or environmental conditions prohibit large or open air power distribution substations.

DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
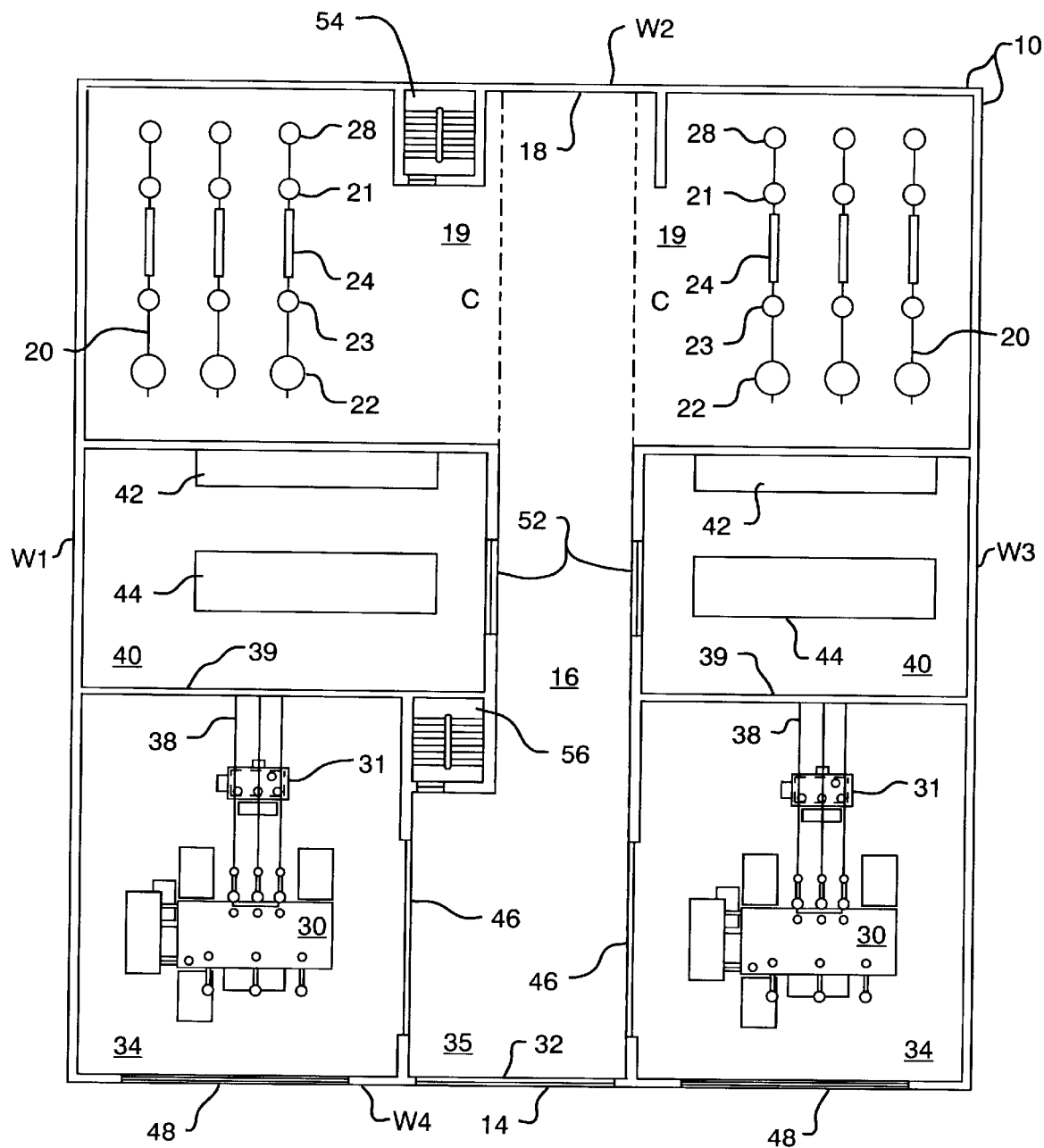
FIG. 1 is a plan view of the ground floor of a first embodiment of a power distribution substation constructed according to the principles of the present invention.

Referring now to the drawings in detail, and particularly to FIG. 1, there is shown a first embodiment of a power substation according to the present invention, adapted to comprise two primary transformers. Said substation comprises a walled and roofed building 10 to enclose a power distribution substation comprising a ground floor and an upper floor. The exterior walls W1, W2, W3 and W4 of the substation are preferably each about 100 feet in length in an approximately square substation having two primary transformers 30. The ground floor layout, as represented in FIG. 1, is generally of a rectangular construction and has a generally centrally disposed access corridor 16 also defined by the dashed lines "C". Where "front end 32" of building 10 defines a side of building 10 which fronts a street or yard having public access, corridor 16 leads from front end 32 of building 10 to an opposing rear end 18 of said building, and has an entrance gate 14 in front wall W4 at front end 32, or in both walls W4 and W2. Both central corridor 16 and gate 14 are sized to accommodate a maintenance truck.

Figure 2:
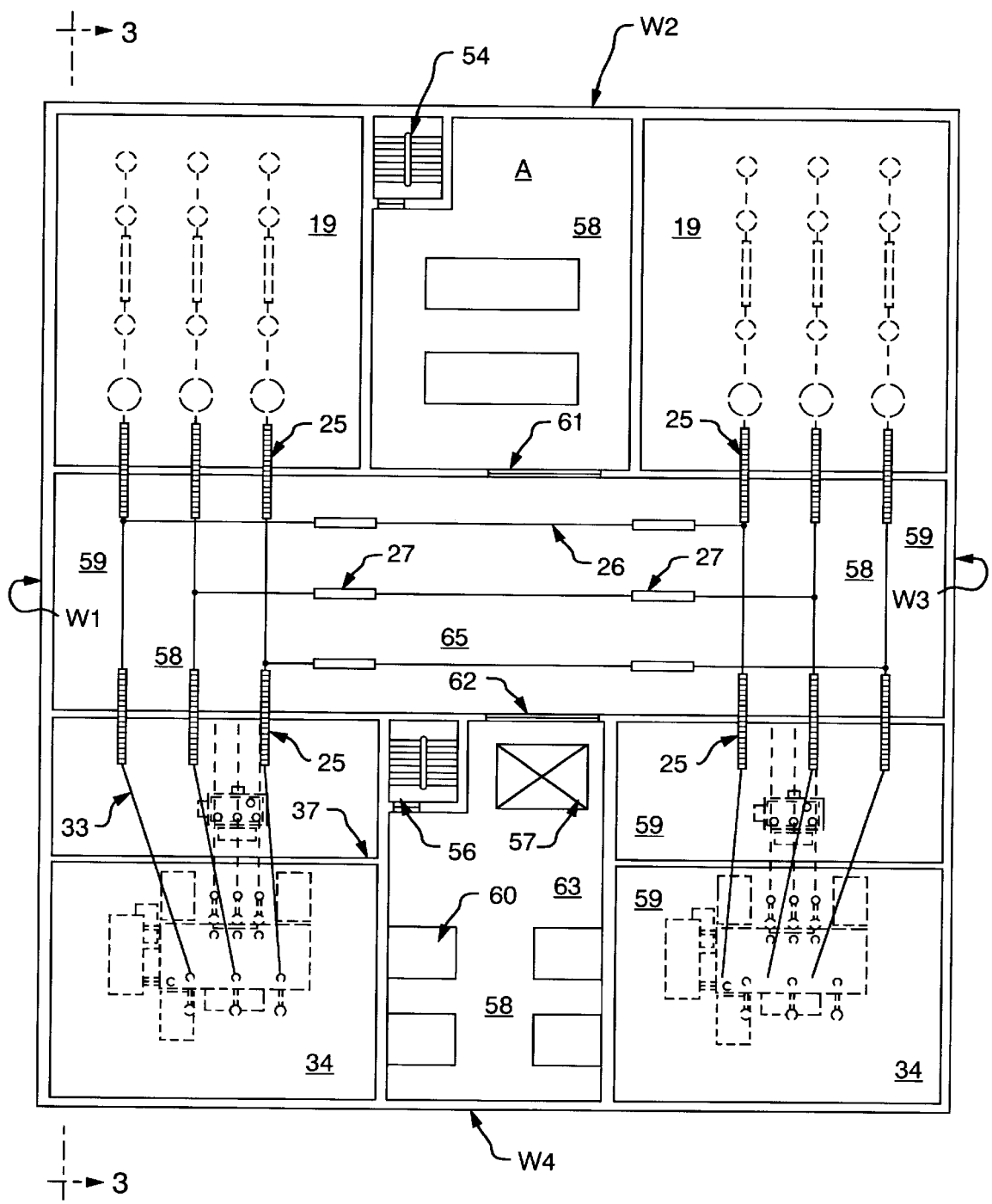
FIG. 2 is a plan view of the upper floor of said first embodiment of a power distribution substation constructed according to the principles of the present invention.
Figure 3:
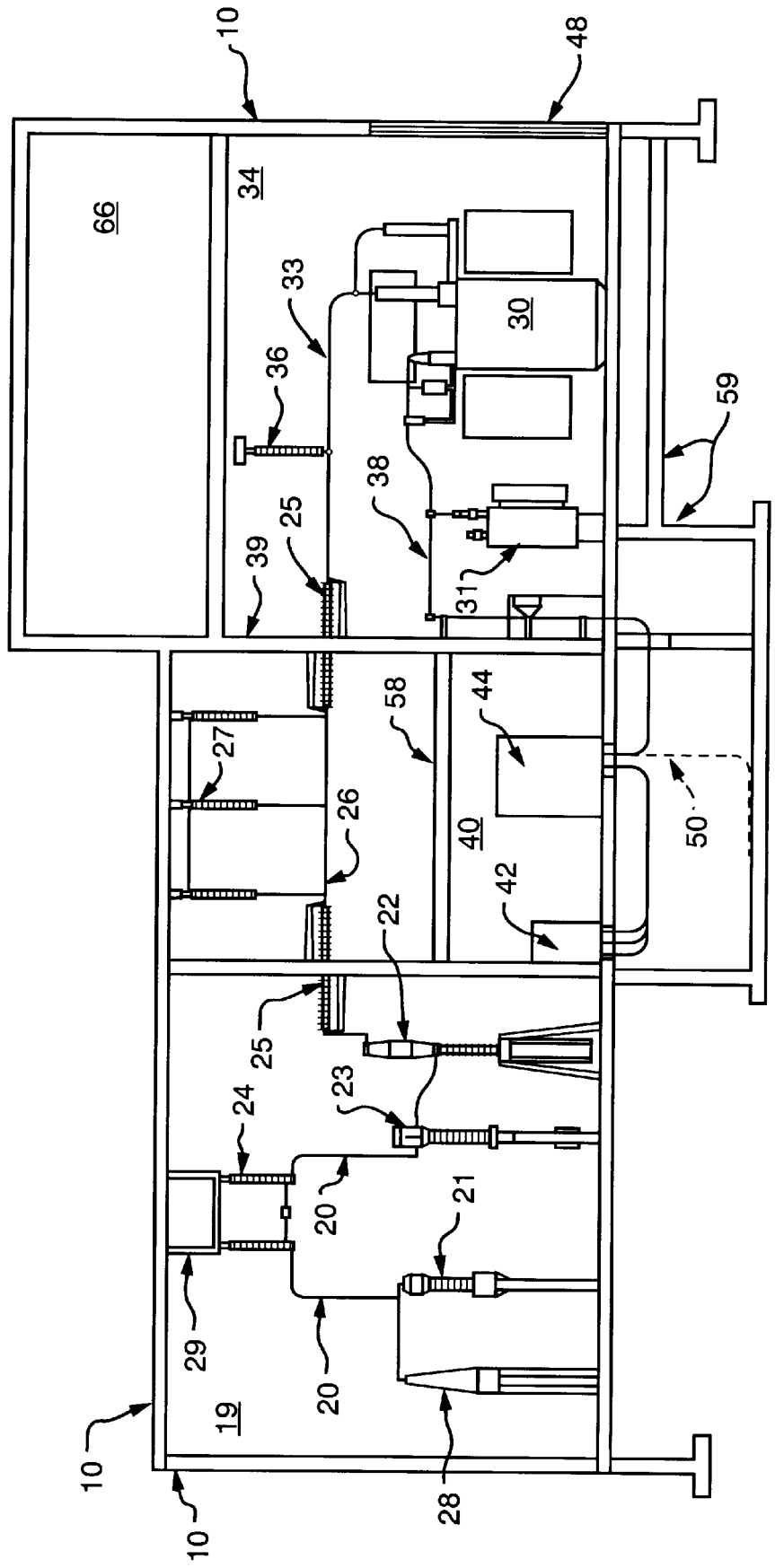
FIG. 3 is a view taken along the lines 3—3 of FIG. 2 showing a side elevational view of the power distribution substation, partially in section.

The ground floor at the rear end 18 of substation building 10 is the entry for two independent sets of underground high-voltage incoming lines 28 and it encloses bus-banks 20 on opposite sides of central corridor 16. Said incoming lines and bus-banks are connected to voltage transformers 21, switches 24, current transformers 23, and breakers 22 at the rear portion 19 of building 10, and are in communication, via bus-bars 33 overhead the upper floor, as represented in FIGS. 2 and 3, to primary transformers 30 arranged in transformer rooms 34 at the front portion 35 of building 10.

The electrical connections that as described join each set of incoming high voltage line 28 to a primary transformer 30 located on the same side of central corridor 16 thus function to form two independent high-voltage circuits. However these two high-voltage circuits are interconnected (as shown in FIG. 2) by overhead lines 26, which are disposed in space 65 over the central part of upper floor 58, and connect/disconnect switches 27 on each of said lines 26. This arrangement permits the permutation of the two incoming sets of high-voltage lines without substation shutdown as may be needed for repairs or maintenance.

A soundproof and fireproofed transformer room 34 is disposed on the ground floor and at the front part of building 10 on either side of central corridor 16. Each transformer room 34 encloses a primary (or "power") transformer 30 that is electrically connected via a bus-bar 33 to high-voltage breakers 22 as stated above, and that is also electrically connected, via mid-voltage bus-bar 38, to metal-clad switch gears 44, as is shown in FIGS. 1 and 3. Additionally transformer room 34 also contains ground transformer 31 which is electrically connected to bus-bar 38 at a point between primary transformer 30 and switch gears 44.

A pair of walled rooms 40 on either side of the mid-portion of central corridor 16 on the first floor enclose mid-voltage metal-clad switch gears 44, which comprise potential transformers and ground switches, and relief switch gears 42. Access to said switch gear rooms 40 is provided by doors 62 that open onto central corridor 16. Outgoing power lines 50 from switch gears 44 distribute the reduced-voltage electrical power to the distribution pool network, preferably through under-floor conduits.

Referring to FIG. 2, stairs 54 and 56 provide access to an upper floor 58 from central corridor 16 on the ground floor. As represented by FIG. 2, said upper floor is preferably cross-shaped and so arranged that it has flooring preferably only above central corridor 16 on the ground floor and also in lateral wings 59 disposed only above the walled switch-gear rooms 40 of the ground floor. The cross-shaped footprint of upper floor 58 contributes importantly to the efficient use of substation space and therefore to the compactness of the substation of the invention. In addition to housing control room A and capacitor bank room 63, this upper floor lay-out provides an upper floor catwalk extending laterally over switch-gear rooms 40 from which station personnel may service overhead switches 25, at either end of overhead bus bars 33, and also to service overhead connect/disconnect switches 27 and associated bus bar 26. The cruciform layout of the upper floor allows for an open two-story space at the corners of rear portion 19 of building 10 for the high-voltage connection equipment on each side of ground floor central corridor 16, and (as shown on FIGS. 3, 4 and 5) it also provides space 66 above ground floor transformer rooms 34 at front portion 35 of building 10, suitable to house heat exchangers, blowers and other mechanical equipment to ventilate transformers 30.

Figure 4:
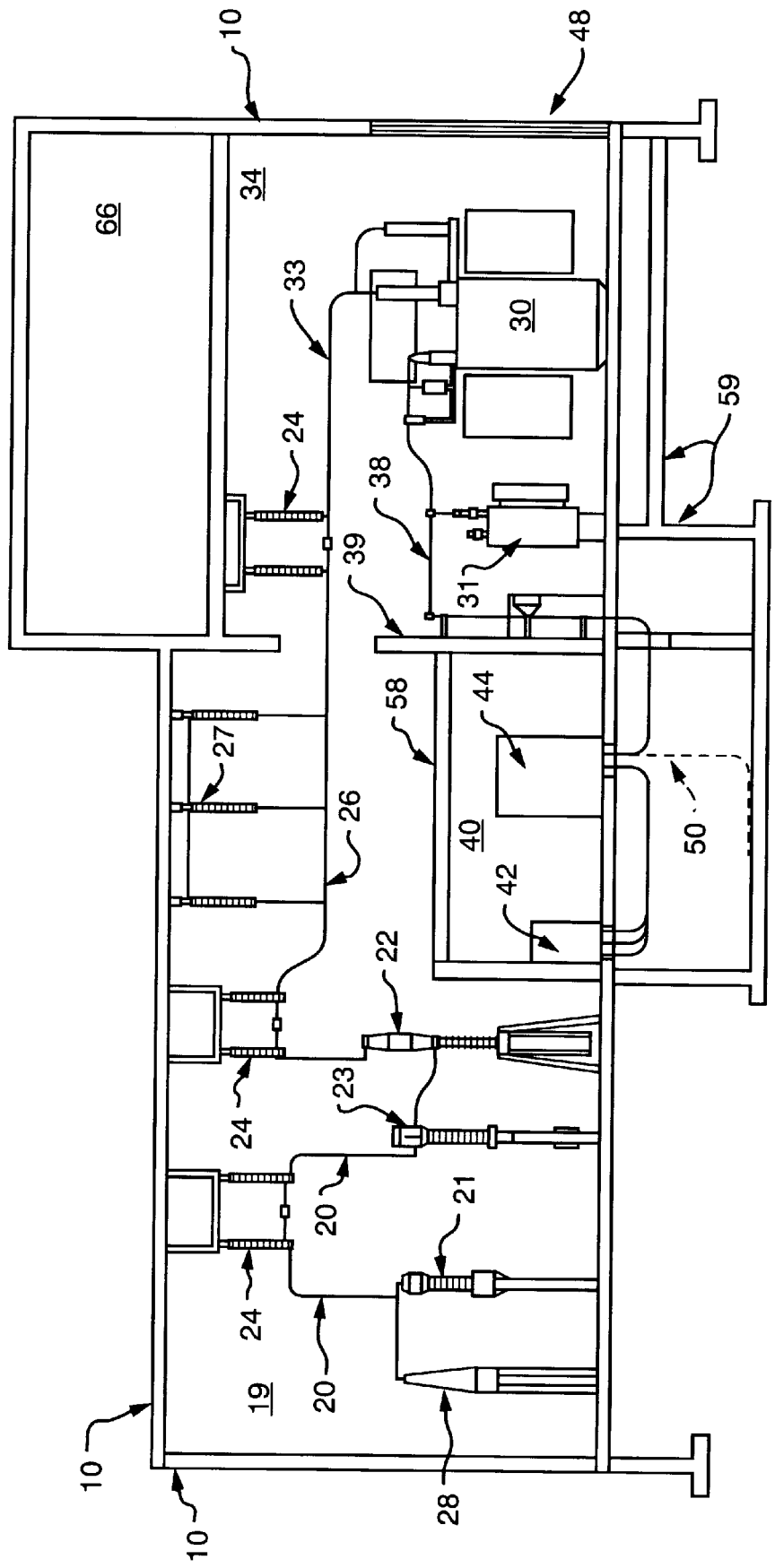
FIG. 4 is a view, also taken along the lines 3—3 of FIG. 2, showing a side elevational view of a second embodiment of the power distribution substation, partially in section.
Figure 5:
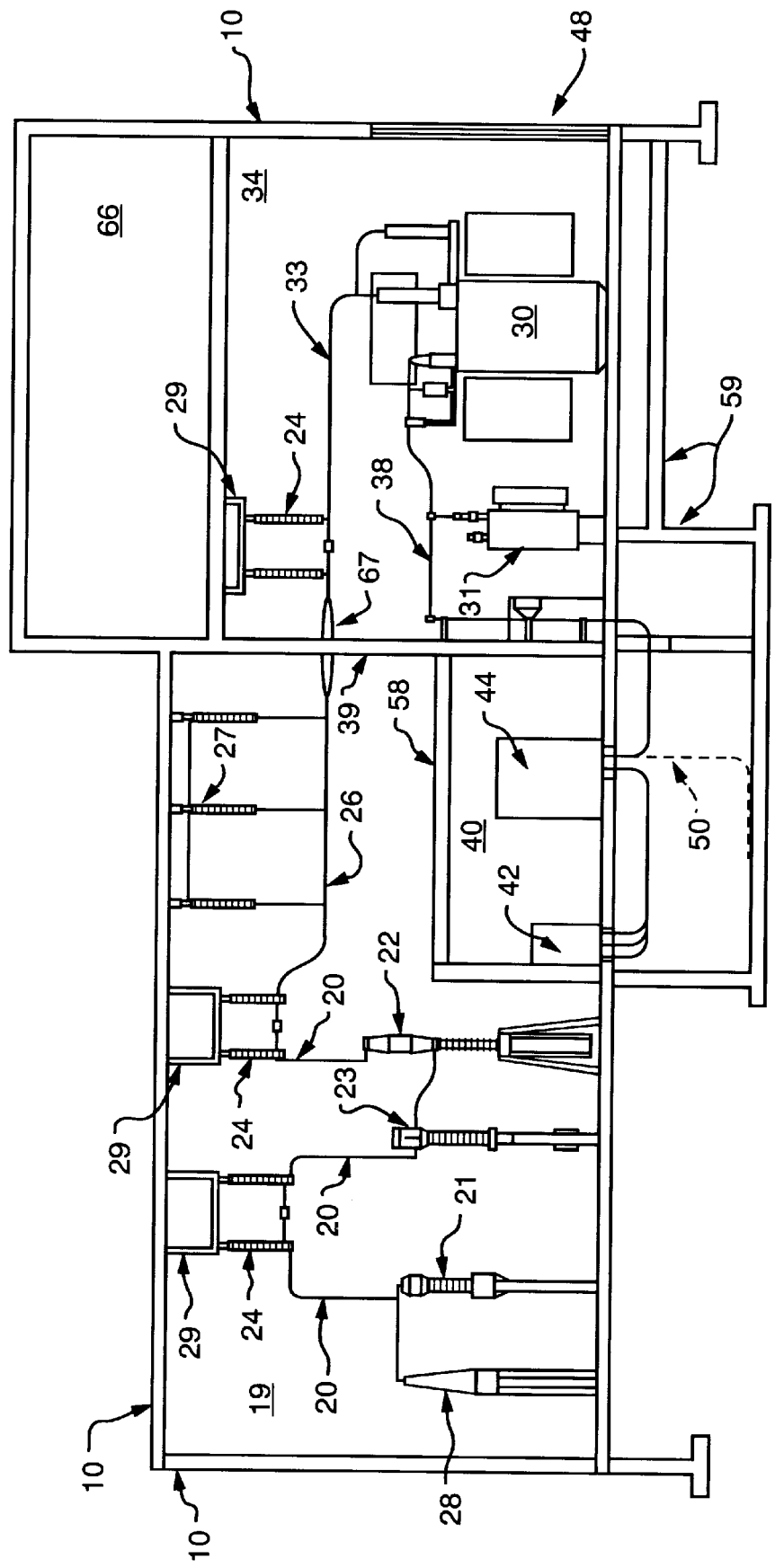
FIG. 5 is a also a view taken along the lines 3—3 of FIG. 2, showing a side elevational view of a third embodiment of the power distribution substation, partially in section.

As shown in FIG. 3 high-voltage breakers 22 are connected via overhead electrical busbars 33 to primary transformers 30. Where the substation services incoming high voltage current no higher than 145 kV, connections between the high-voltage breakers and the primary transformers are made by rotating switches 25 installed near each end of each bus bar 33. At the present time, commercially available ambient-air-insulated rotating switches may not be used safely at voltages higher than 145 kV, and accordingly for higher incoming voltages, to 245 kV, other forms of switches may be used in the substation of the invention. Thus, as represented in FIGS. 4 and 5, rotating switches 25 may be replaced, near each end of bus bars 33, by high-voltage switches 24, and the passage of bus bar 33 through the interior wall 39 of transformer room 34 may be effected either by a simple opening in wall 39, as represented in FIG. 4, or by a wall-traversing bushing 67 in wall 39 as represented in FIG. 5.

A control room "A" having entry door 61 is defined by a walled and doored enclosure, on upper floor 58, that is directly above ground floor central corridor 16 at the rear portion 19 of building 10. Said control room has no power generating or transformer equipment immediately beneath or alongside it, for safety purposes. Also on the second floor and at the opposite end of building 10 from control room A, an enclosed capacitor room 63 encloses at least one capacitor bank 60, which provides added security and minimizes any wasting of space. Capacitor room 63 may be accessed through door 62 from second floor space 65, alternatively through stairs 56 from first floor corridor 16, and (for the passage of heavy and/or bulky equipment including capacitor batteries to or from first floor corridor 16), through trapdoor 57 in the flooring of room 63.

Primary transformers 30 are compartmentalized in walled transformer rooms 34 and each of said transformer rooms is preferably built in a masonry construction and provided with a sound-proof rolling door 46, thereby providing easy access through central corridor 16 for service or replacement of equipment, and for the safety of personnel and equipment. Additionally removable walls 48 may be placed in wall W4 in front end 32 of building 10, as shown in FIG. 1 (or, alternatively, in side walls W1 and W3, where said walls front a street or yard), to provide access to and replacement of primary transformers 30 directly from the street or yard in which substation building 10 is located. Preferably transformer rooms 34 are each equipped with an oil retention system, such as that described in some detail in our earlier U.S. Pat. No. 5,648,888, and with fire protection equipment for example including sprinklers or mist jets (not shown).

It is seen that all of the primary electrical equipment in the substation of the invention is located on a single main floor, here defined as the ground floor, and that ground floor central corridor 16 and entrance gate 14 are sized to accommodate a maintenance truck, rendering repair and replacement of equipment easier than is shown in the prior art.

Substation building 10 will generally also comprises conventional additional equipment, including as shown on FIG. 3 switch support 29 for switch 24, and insulator 36 and its insulator support 37. Also, an arrangement of heat exchangers and/or blowers, not shown, may be disposed in and above transformer rooms 34 to recuperate heat generated by primary transformers 30 for use elsewhere in building 10, particularly in cold weather locations and more generally during cold weather.

The power distribution substation of the present invention may be used in any location, and particularly in urban areas and other areas where economic, topographical, or environmental conditions prohibit large or open air power distribution substations.

We claim:

1. A power distribution substation for the distribution of electrical power from high-voltage incoming lines to a consumption pool network, said substation comprising:

a walled building having a ground floor and an upper floor;

a central corridor dividing said ground floor into two sides and extending from a front part of said building through a mid-part thereof and to a rear part thereof;

a walled mid-voltage switch gear room located on each side of the central corridor, on the ground floor at the mid-part of said building;

a walled transformer room located on each side of the central corridor, on the ground floor at the front part of said building, enclosing at least one primary transformer in each of said transformer rooms;

a space on each side of the central corridor at said rear part of the building, enclosing breakers and connect/disconnect switches in communication with said primary transformers; and high voltage incoming lines entering the building at the rear end thereof and, on either side of the central corridor, being in electrical communication with said breakers and connect/disconnect switches at the rear part of the building.

2. The power distribution substation recited in claim 1, wherein said enclosure has an upper floor of generally <<cross>> shape, the flooring on which upper floor is disposed only above said central corridor and above said mid-voltage switch gear rooms.

3. The power distribution substation recited in claim 2, including a walled control room on the upper floor at the rear part of the building and only above said central corridor.

4. The power distribution substation recited in claim 3, wherein the upper floor includes at the front part of the building a walled room above the central corridor to enclose an arrangement of capacitors.

5. The power distribution substation recited in claim 2, wherein the breakers located in the rear part of the building and the primary transformers are in electrical communication by busbars extending over a portion of the upper floor above the mid-voltage switch gear rooms.

6. The power distribution substation recited in claim 5, wherein said walled building is generally rectangular and comprises four outer walls each about 100 feet in length.

7. The power distribution substation recited in claim 5, wherein the central corridor extending from the front end to the rear end of said walled building is about 100 feet in length.

8. The power distribution substation recited in claim 3, wherein the control room has no active electrical power substation equipment beneath it.

9. A power distribution substation for the distribution of electrical power from high-voltage incoming lines to a consumption pool network, said substation comprising:

a walled building enclosure having a ground floor and an upper floor;

a corridor extending generally along a mid-portion of said ground floor, from a front end of said building through a mid-part thereof to a rear end thereof, and dividing said ground floor into two sides;

a walled mid-voltage switch-gear room arranged on the ground floor on each side of the corridor, at the mid-part of the building;

a walled transformer room, each containing one primary transformer, located on each side of the corridor in the front end of the ground floor;

two independent high-voltage incoming lines arranged one on each side of the corridor at the rear end of the building;

a room on each side of the ground floor corridor, at the rear end of the building, to contain breakers and connect/disconnect switches in communication with the primary transformers;

an upper floor having flooring only above the ground floor corridor and above the switch-gear rooms;

a walled control room located on the upper floor above the portion of the corridor at the rear end of the building, said control room having no active electrical power substation equipment beneath it; and busbars extend across the upper floor from the primary transformers at the front end of the building to the breakers and connect/disconnected switches at the rear end of the building and said busbars effect electrical communication therebetween.

10. A method of providing electrical generation capacity to a geographical area, by the step of:

building an electrical power substation, said substation comprising a walled enclosure having a ground floor and an upper floor; a generally centrally arranged corridor extending along a mid portion of said ground floor, from a front end of the building to a rear end thereof; a walled mid-voltage switch-gear room located on each side of the ground floor corridor, at a midpoint thereof; a walled transformer room, for enclosing a primary transformer, located on each side of the corridor at the front end of the building; an arrangement of high-voltage incoming lines arranged on each side of the corridor at the rear end of the building; a room on each side of the corridor to enclose breakers in electrical communication with the primary transformers; said enclosure having an upper floor of generally <<cross>> shape, disposed only above the corridor and above the switch-gear rooms; a walled control room on the upper floor, arranged above the rear end of the corridor and having no active electrical substation equipment beneath it; where said breakers on the rear end of the ground floor and the primary transformers are put in electrical communication by busbars extending across said upper floor.

* * * * *